United States Patent
Chiba

(10) Patent No.: US 10,462,841 B2
(45) Date of Patent: Oct. 29, 2019

(54) EFFICIENT SECONDARY CELL GROUP CHANGE PROCEDURE FOR DUAL CONNECTIVITY

(71) Applicant: Nokia Solutions and Networks Oy, Espoo (FI)

(72) Inventor: Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 11 days.

(21) Appl. No.: 15/542,492

(22) PCT Filed: Jan. 14, 2015

(86) PCT No.: PCT/EP2015/050558
§ 371 (c)(1),
(2) Date: Jul. 10, 2017

(87) PCT Pub. No.: WO2016/112970
PCT Pub. Date: Jul. 21, 2016

(65) Prior Publication Data
US 2018/0288826 A1 Oct. 4, 2018

(51) Int. Cl.
*H04L 12/56* (2006.01)
*H04W 76/34* (2018.01)
*H04W 76/15* (2018.01)

(52) U.S. Cl.
CPC ........... *H04W 76/34* (2018.02); *H04W 76/15* (2018.02)

(58) Field of Classification Search
CPC .............................. H04W 76/15; H04W 76/34
See application file for complete search history.

(56) References Cited

U.S. PATENT DOCUMENTS

2017/0195935 A1* 7/2017 Xu .................. H04W 36/08

FOREIGN PATENT DOCUMENTS

WO 2014/209204 A1 12/2014

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP TR 36.842, V1.0.0, Nov. 2013, pp. 1-68.

(Continued)

*Primary Examiner* — Bo Hui A Zhu
(74) *Attorney, Agent, or Firm* — Harrington & Smith

(57) ABSTRACT

Certain embodiments of the invention generally relate to mobile communications networks. For example, some embodiments relate to secondary cell group change procedure(s) for dual connectivity. A method may include receiving, at a network node, a secondary network node modification required message comprising secondary cell group configuration information for one or more secondary cell group data radio bearer type changes. The method may also include deciding to reject at least one of the one or more secondary cell group data radio bearer type changes. The method may further include sending a secondary network node modification request comprising an indication that the at least one secondary cell group data radio bearer type change is rejected by the network node, and that release of at least one or more secondary cell group data radio bearers is to be performed.

12 Claims, 7 Drawing Sheets

(56) References Cited

OTHER PUBLICATIONS

"Revised Work Item Description: Dual Connectivity for LTE", 3GPP TSG-RAN meeting #65, RP-141266, Agenda: 11.7.9, NTT DOCOMO, Inc, Sep. 9-12, 2014, 8 pages.
"Introduction of Dual Connectivity", 3GPP TSG-RAN WG2 meeting #88, R2-145410, NTT DOCOMO, Inc, Nov. 17-21, 2014, 65 pages.
"Discussion on DRB Addition/Release and SCG Change", 3GPP TSG-RAN WG2 meeting #88, R2-145115, Alcatel-Lucent, Nov. 17-21, 2014, 4 pages.
"SeNB Initiated SCG Change Procedure", 3GPP TSG-RAN WG3 meeting #86, R3-142734, Nokia Networks, Nov. 17-21, 2014, 5 pages.
"How to Realise DRB type Change by Means of X2AP Signalling", 3GPP TSG-RAN WG3 meeting #86, R3-142921, Ericsson, Nov. 17-21, 2014, 3 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V12.3.0, Sep. 2014, pp. 1-215.
"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423, V12.3.0, Sep. 2014, pp. 1-153.
International Search Report and Written Opinion received for corresponding Patent Cooperation Treaty Application No. PCT/EP2015/050558, dated Sep. 15, 2015, 14 pages.
"Open Issue Resolution of Stage 2 Overall Procedures", 3GPP TSG-RAN Working Group 3 meeting #84, R3-141090, Agenda: 20.1.2, NSN, May 19-23, 2014, 26 pages.
"SCG Mobility Procedures", 3GPP TSG-RAN Working Group 3 meeting #83, R3-140612, Agenda: 20.1.2, NSN, Mar. 31-Apr. 4, 2014, 17 pages.
"Correction of SeNB Addition and SeNB Modification", 3GPP TSG-RAN Working Group 3 meeting #84, R3-141166, Alcatel-Lucent, May 19-23, 2014, 9 pages.
"Alignment of RAN2 and RAN3 Stage 2 Discussions", 3GPP TSG-RAN Working Group 2 meeting #87, R2-143642, Agenda: 7.1.2, Alcatel-Lucent, Aug. 18-22, 2014, 14 pages.

* cited by examiner

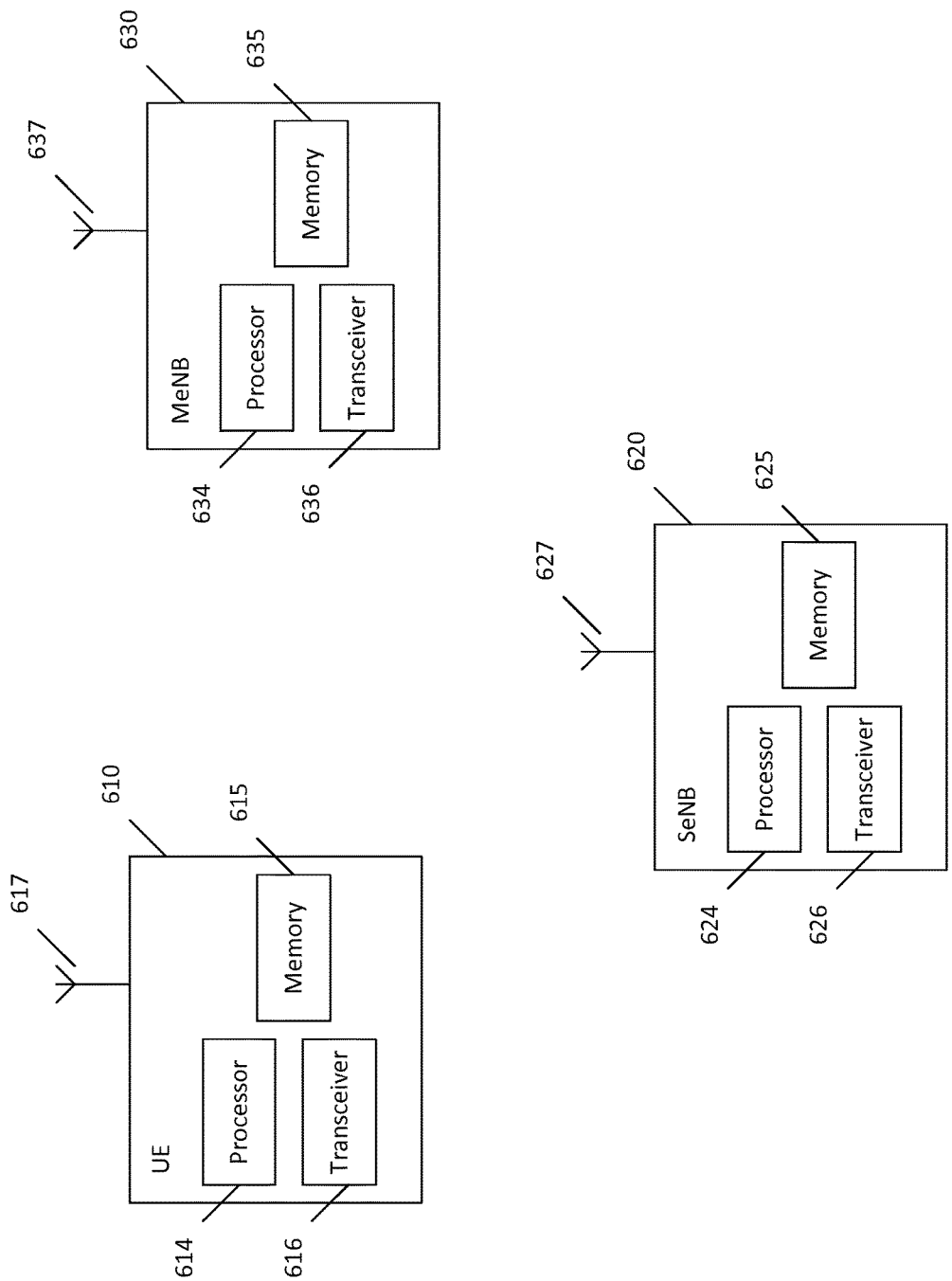

EFFICIENT SECONDARY CELL GROUP CHANGE PROCEDURE FOR DUAL CONNECTIVITY

RELATED APPLICATION

This application was originally filed as PCT Application No. PCT/EP2015/050558 filed Jan. 14, 2015.

BACKGROUND

Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN). For example, some embodiments relate to secondary cell group change procedure(s) for dual connectivity.

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node-Bs. The RNC and its corresponding Node-Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs. In addition, LTE is an all internet protocol (IP) based network, supporting both IPv4 and Ipv6.

Dual connectivity is a mode of operation of a user equipment (UE) in a radio resource control (RCC) connected mode (RCC_CONNECTED mode), configured with a master cell group (MCG) and a secondary cell group (SCG).

SUMMARY

One embodiment is directed to a method that includes receiving, at a network node, a secondary network node modification required message comprising secondary cell group configuration information for one or more secondary cell group data radio bearer type changes. In an embodiment, the method may also include deciding to reject at least one of the one or more secondary cell group data radio bearer type changes. In another embodiment, the method may further include sending a secondary network node modification request comprising an indication that the at least one secondary cell group data radio bearer type change is rejected by the network node, and that release of at least one or more secondary cell group data radio bearers is to be performed.

In an embodiment, the indication that the at least one secondary cell group data radio bearer type change is rejected by the network node, and that the release of at least one or more secondary cell group data radio bearers is to be performed may be indicated in a general packet radio service tunneling protocol user plane extension header over an X2 user plane when the network node decides to release the at least one or more secondary cell group data radio bearers.

In an embodiment, the method may further include deciding to reject all of the one or more secondary cell group data radio bearer type changes. In another embodiment, the method may also include sending an indication to a terminal that all of the one or more secondary cell group data radio bearers are released.

In an embodiment, the method may further include accepting at least one secondary cell group data radio bearer type change. In an embodiment, the method may also include sending a connection reconfiguration message to the terminal, wherein the connection reconfiguration message may include the secondary cell group configuration information for at least one accepted secondary cell group data radio bearer.

In an embodiment, the method may further include receiving a secondary network node modification request acknowledgement indicating that the at least one secondary cell group data radio bearer type change has been rejected and that the release of one or more secondary cell group data radio bearers has been performed.

In an embodiment, the connection reconfiguration message may be sent in parallel of sending the secondary network node modification request comprising the indication and before the network node receives the secondary network node modification request acknowledgement.

In an embodiment, the network node does not perform any radio resource control connection termination between the network node and a secondary network node prior to transmitting the secondary network node modification request.

Another embodiment is directed to an apparatus that may include at least one processor, and at least one memory including computer program code. The at least one memory and the computer program code may be configured, with the late last one processor, to cause the apparatus at least to receive, at a network node, a secondary network node modification required message comprising secondary cell group configuration information for one or more secondary cell group data radio bearer type changes. The at least one memory and the computer program code may also be configured, with the late last one processor, to cause the apparatus at least to decide to reject at least one of the one or more secondary cell group data radio bearer type changes. The at least one memory and the computer program code may further be configured, with the late last one processor, to cause the apparatus at least to send a secondary network node modification request comprising an indication that the at least one secondary cell group data radio bearer type change is rejected by the network node, and that release of at least one or more secondary cell group data radio bearers is to be performed.

Another embodiment is directed to an apparatus may include receiving means for receiving, at a network node, a secondary network node modification required message comprising secondary cell group configuration information for one or more secondary cell group data radio bearer type changes. The apparatus may also include deciding means for deciding to reject at least one of the one or more secondary cell group data radio bearer type changes. The apparatus may further include sending means for sending a secondary network node modification request comprising an indication that the at least one secondary cell group data radio bearer type change is rejected by the network node, and that release of at least one or more secondary cell group data radio bearers is to be performed.

In an embodiment, the indication that the at least one secondary cell group data radio bearer type change is rejected by the network node, and that the release of at least one or more secondary cell group data radio bearers is to be performed may be indicated in a general packet radio service tunneling protocol user plane extension header over an X2 user plane when the network node decides to release the at least one or more secondary cell group data radio bearers.

In an embodiment, the apparatus may further include deciding means for deciding to reject all of the one or more secondary cell group data radio bearer type changes. In an embodiment, the apparatus may also include sending means for sending an indication to a terminal that all of the one or more secondary cell group data radio bearers are released.

In an embodiment, the apparatus may further include accepting means for accepting at least one secondary cell group data radio bearer type change. In an embodiment, the apparatus may also include sending means for sending a connection reconfiguration message to a terminal, wherein the connection reconfiguration message includes the secondary cell group configuration information for at least one accepted secondary cell group data radio bearer.

In an embodiment, the apparatus may include receiving means for receiving a secondary network node modification request acknowledgement indicating that the at least one secondary cell group data radio bearer type change has been rejected and that the release of one or more secondary cell group data radio bearers has been performed.

In an embodiment, the connection reconfiguration message may be sent in parallel of sending the secondary network node modification request comprising the indication and before the network node receives the secondary network node modification request acknowledgement.

In an embodiment, the network node does not perform any radio resource control connection termination between the network node and a secondary network node prior to transmitting the secondary network node modification request.

In an embodiment, a computer program, may be embodied on a non-transitory computer readable medium, the computer program configured to control a processor to perform the method according to method described above.

Another embodiment is directed to a method that may include sending, from a second network node, a secondary network node modification required message comprising secondary cell group configuration information for one or more secondary cell group data radio bearer type changes. In an embodiment, the method may also include receiving a secondary network node modification request including an indication that at least one secondary cell group data radio bearer type change is rejected by a first network node, and that release of at least one or more secondary cell group data radio bearers is to be performed.

In an embodiment, the indication that the at least one secondary cell group data radio bearer type change is rejected by the first network node, and that the release of at least one or more secondary cell group data radio bearers is performed may be indicated in a general packet radio service tunneling protocol user plane extension header over an X2 user plane when the first network node decides to release the at least one or more secondary cell group data radio bearers.

In an embodiment, the method may further include sending a secondary network node modification request acknowledgment indicating that the release of at least one or more secondary cell group data radio bearers has been performed.

Another embodiment is directed to an apparatus that may include at least one processor, and at least one memory including computer program code. The at least one memory and the computer program code may be configured, with the at least one processor, to cause the apparatus at least to send, from a second network node, a secondary network node modification required message including secondary cell group configuration information for one or more secondary cell group data radio bearer type changes. The at least one memory and the computer program code may also be configured, with the at least one processor, to cause the apparatus at least to receive a secondary network node modification request comprising an indication that at least one secondary cell group data radio bearer type change is rejected by a first network node, and that release of at least one or more secondary cell group data radio bearers is to be performed.

Another embodiment is directed to an apparatus that may include sending means for sending, from a second network node, a secondary network node modification required message including secondary cell group configuration information for one or more secondary cell group data radio bearer type changes. In an embodiment, the apparatus may also include receiving means for receiving a secondary network node modification request including an indication that at least one secondary cell group data radio bearer type change is rejected by a first network node, and that release of at least one or more secondary cell group data radio bearers is to be performed.

In an embodiment, the indication that the at least one secondary cell group data radio bearer type change is rejected by the first network node, and that the release of at least one or more secondary cell group data radio bearer is performed may be indicated in a general packet radio service tunneling protocol user plane extension header over an X2 user plane when the first network node decides to release the at least one or more secondary cell group data radio bearers.

In an embodiment, the apparatus may further include sending means for sending a secondary network node modification request acknowledgment indicating that the release of one or more secondary cell group data radio bearers has been performed.

In an embodiment, a computer program, may be embodied on a non-transitory computer readable medium, the computer program configured to control a processor to perform the method described above.

BRIEF DESCRIPTION OF THE DRAWINGS

For proper understanding of the invention, reference should be made to the accompanying drawings, wherein:

FIG. 6 illustrates a system according to certain embodiments.

DETAILED DESCRIPTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Embodiments of the invention relate to an efficient secondary cell group (SCG) change procedure for dual connectivity. In an embodiment, dual connectivity may be considered to be the mode of operation of a UE in RRC_CONNECTED mode, configured with a master cell group (MCG) and a secondary cell group (SCG). For instance, dual connectivity mode may refer to when one UE has two radio connections with two access points, for example, one macro and one small cell EnodeB (eNB).

Figure 1:
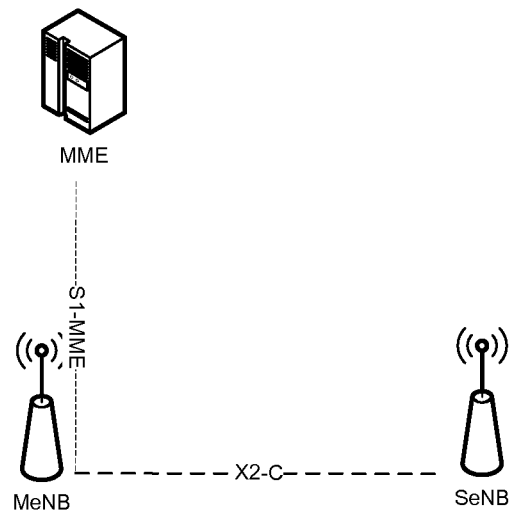
FIG. 1 illustrates a C-plane connectivity of eNBs involved in dual connectivity.

FIG. 1 illustrates an example of a control plane (C-plane) connectivity of eNBs involved in dual connectivity. In particular, FIG. 1 illustrates a master eNB (MeNB) connected to a mobility management entity (MME) via an S1-MME interface. FIG. 1 also illustrates a secondary eNB (SeNB) that is connected to the MeNB via an X2-C interface.

Figure 2:
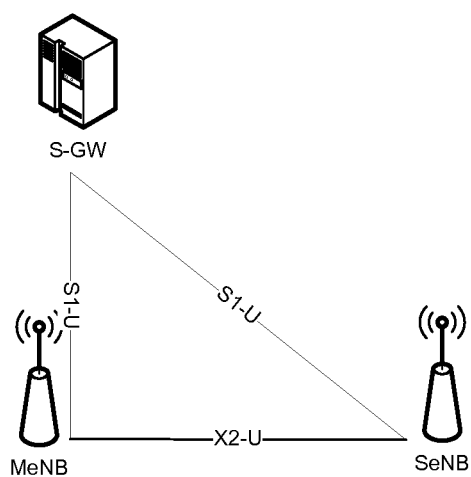
FIG. 2 illustrates a U-plane connectivity of eNBs involved in dual connectivity.

FIG. 2 illustrates an example of a user plane (U-plane) connectivity of eNBs involved in dual connectivity. In particular, FIG. 2 illustrates a MeNB connected to a serving gateway (S-GW) via an S1-U interface. FIG. 2 also illustrates a SeNB connected to both the MeNB and the S-GW via an X2-U and S1-U interface, respectively.

In dual connectivity, there may be at least three types of bearers. For example, first, these bears may include MCG bearers. Here, the MeNB may be a U-plane connected to the S-GW via the S1-U interface. The SeNB may not be involved in the transport of user plane data.

Second, the bearers may include split bearers. Here, the MeNB may be U-plane connected to the S-GW via the S1-U interface and in addition, the MeNB and the SeNB may be interconnected via the X2-U interface.

Third, the bearers may include SCG bearers. Here, the SeNB may be directly connected with the S-GW via the S1-U interface.

Discussions on how to support data radio bearer (DRB) type change led to various agreements in 3GPP. In one agreement, direct establishment of an SCG bearer and a split bearer may be performed with RRCConnectionReconfiguration not involving an SCG change. For example, there may be no packet data convergence protocol (PDCP) or radio link control (RLC) re-establishment, and no reset of medium access control (MAC) at the SCG. However, this does not apply for default bearers.

In a second agreement, the UE may also support bearer release without an SCG Change. This may be needed for the MeNB initiated bearer release. Furthermore, in a third agreement, if the SeNB does not include the mobilityControlInfoSCG (as part of a container) and indicates to release a bearer, the MeNB may execute the release of the SCG part of the bearer without the SCG Change, and thereby avoid the interruption caused by the reestablishment caused by an SCG Change. Since the MeNB is in control of the evolved packet system (EPS) bearer, the MeNB may, for example, request the SCG to release the bearer or to perform an SCG Change in case the MeNB wants to maintain the bearer as an MCG bearer. Thus, in an SeNB initiated case, the MeNB may decide whether to release the bearer or to perform bearer type change.

According to the agreements discussed above, a solution of a DRB type change and several alternatives were provided. In a first alternative, the DRB may release a trigger by the SeNB if the RRC container is not included in a first step. Then, the MeNB may include the RRC container in a later step, if the MeNB decides of a bearer type change. If not, the MeNB may release the bearer. If the RRC container is included in a first step, then the MeNB may (based on implementation), initiate a Bearer Change, refuse the Bearer Change, or release the bearer with an SCG Change.

In a second alternative, the DRB may be released by a trigger from the SeNB, in which the MeNB may always initiate an SCG Change. Further, in a third alternative, the DRB may be released by a trigger from the SeNB, when the container is not included in a first step, and the MeNB may decide whether to release the bearer or perform a bearer type change in subsequent steps. Additionally, in a fourth alternative, the DRB may be released by a trigger from the SeNB, in which the container may always be included, and the MeNB may decide whether to release the bearer or perform a bearer type change. After the discussions, it was agreed to adopt the third alternative discussed above since no solution was available for the second alternative.

However, considering the fact that a DRB type change (SCG/split bearer to MCG bearer) would be done in most cases, this solution may not be efficient because it may need two X2 messages before SeNB creates a radio resource control (RRC) message. This creates delays before the MeNB may send an RRC Connection Reconfiguration message to the UE, and may lead to packet drops.

Figure 3:
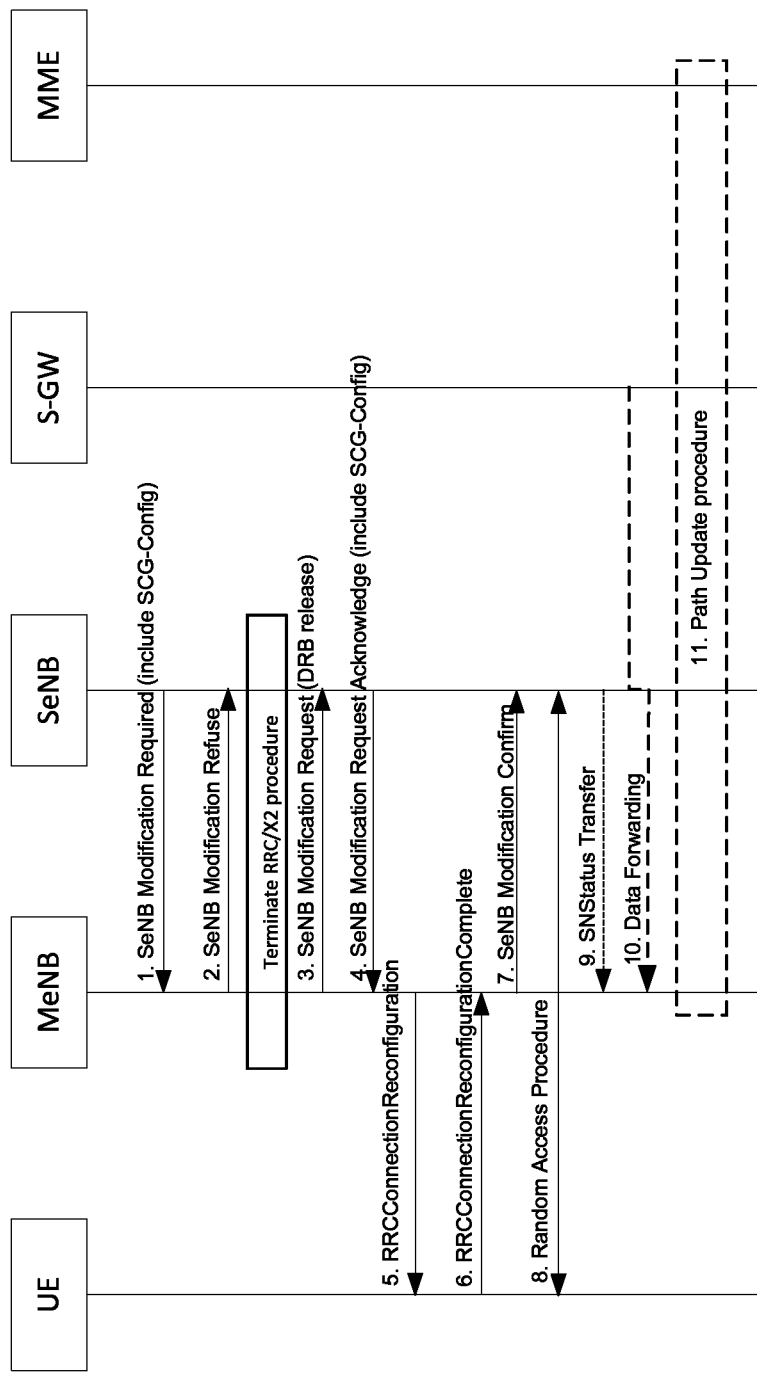
FIG. 3 illustrates a DRB release with an existing mechanism.

As an example of an existing solution where the RRC container is included in a first step, FIG. 3 illustrates the DRB release with the existing mechanism with the container in step 1. If there is no SCG-Config in step 1, the MeNB cannot perform a DRB type change in a fast manner. Therefore, in the example shown in FIG. 3, SCG-Config is assumed to be conveyed in step 1.

Further, in the solution of FIG. 3, the container (i.e., RRC information provided by the SeNB, forwarded to the UE) is received by the MeNB in the SeNB modification required message. After this, at step 2, the MeNB may refuse the SeNB Modification Required message, and terminate the existing RRC/X2 procedure. Then, at step 3, the MeNB may create another X2 procedure by sending an SeNB Modification Request for DRB release.

At step 4, the SeNB may send a Modification Request Acknowledgment, which may include the SCG-Configuration (e.g., new radio resource configuration of SCG, a.k.a. SCG-Config), as part of the container. A re-send of the container may be needed because the termination of the X2/RRC procedure may clear the resources. At step 5, the MeNB may send an RRCConnectionReconfiguration to the UE (including the container), and in response, at step 6, the UE may send an RRCConnectionReconfigurationComplete to the MeNB. As mentioned above, a drawback in proceeding according to this manner is that it causes a delay due to additional signaling as well as terminating the X2/RRC procedure first. Therefore, it takes a relatively long time before the UE gets the RRCConnectionReconfiguration message in step 5.

At step 7, upon receipt of the RRCConnectionReconfigurationComplete, the MeNB may send an SeNB Modification Confirmation to the SeNB. At step 8, a Random Access Procedure may be established between the UE and the SeNB. Further, at step 9, after completion of the Random Access Procedure, the SeNB may send an SN Status Transfer to the MeNB. Then, at step 10, data forwarding between the MeNB and SeNB may begin. Finally, at step 11, if applicable, a path update may be performed among the MeNB, SeNB, S-GW and MME. Thus, as discussed above and further shown in FIG. 3, an issue of the existing solution is that DRB release cannot be performed without terminating the RRC/X2 procedure.

Accordingly, certain embodiments of the present invention provide ways to address the issues described above. For example, in certain embodiments, the MeNB may indicate, via an additional flag in the SeNB Modification Request, that DRB type change is rejected and DRB release is performed when the MeNB receives the SeNB Modification Required message including an SCG configuration from the SeNB, and decides to release the SCG DRB.

In certain embodiments, the flag may be one bit. Further, the reason for SCG bearer release may include traffic load or subscriber based charging information, application, and other similar type reasons.

According to other embodiments, in the case of a split bearer, the MeNB may indicate, via an additional flag in a general packet radio service tunneling protocol user plane (GTP-U) extension header over an X2 user plane that a DRB type change is rejected and DRB release is to be performed, when the MeNB receives an SeNB Modification Required message including an SCG configuration from the SeNB and decides to release the SCG DRB. After receiving the flag, the SeNB may locally terminate the RRC procedure and stop waiting for a random access procedure (RACH) from the UE (i.e., handles as DRB release). Thus, the MeNB need not perform the X2/RRC termination. Further, the proposed solution then does not need the connection re-establishment procedure for steps 3 and 4 of FIG. 3. This may save time and the UE may obtain the required information faster.

Figure 4:
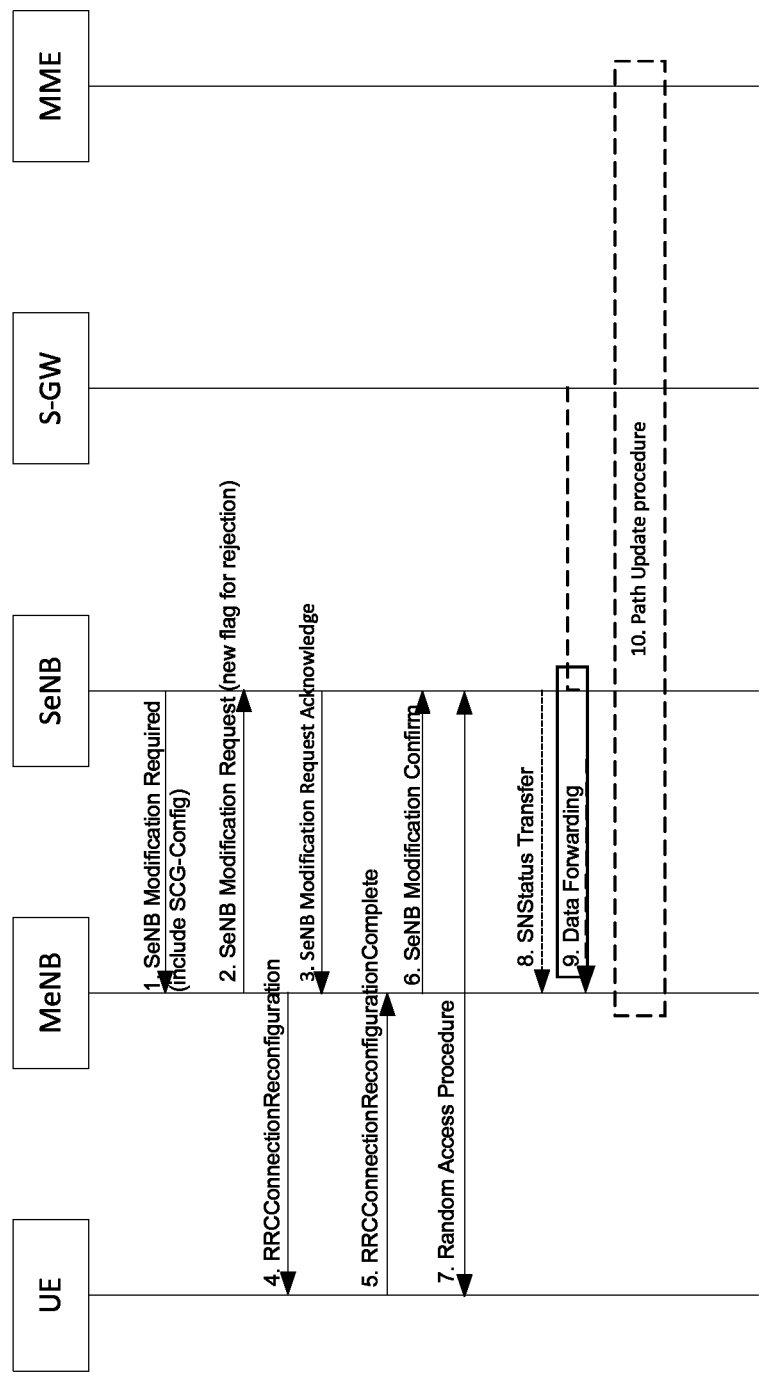
FIG. 4 illustrates a DRB release, according to certain embodiments.

FIG. 4 illustrates an example of a flow diagram of a DRB release, according to certain embodiments. At 1, the SeNB may send an SeNB Modification Required message. The SeNB Modification Required message may include bearer context related information, other UE context related information and SCG-Config, which may include at least one new radio resource configuration of the SCG. According to one embodiment, for bearer release or modification, a corresponding E-UTRAN radio access bearer (E-RAB) list may be included in the SeNB Modification Required message. In another embodiment, in the case of an SCG Change, an SCG Change Indication, together with an SCG-Config may be included in the SeNB Modification Required message. Additionally, in a further embodiment, in the case of releasing the bearer served by SeNB, SCG-Config may be included in the SeNB Modification Required message. It should be noted that the SCG-Config of step 1 may comprise new configuration information for many SCG-bearers, not only for one bearer. However, in one embodiment, the SCG-Config of step 1 comprises new configuration information for a single SCG-bearer.

At 2, the MeNB may indicate, via an additional flag in the SeNB Modification Request that DRB type change is rejected and DRB release is performed. The release may be performed as the SeNB. Thus, the flag may indicate to the SeNB that it is to perform a SCG bearer release. It may also be noted that in case the container contains SCG-Config for many SCG bearers, then the flag may, in general, be an indication of which one(s) of the SCG bearers are to be dropped. Therefore, in one embodiment, the MeNB may accept the type change for some SCG bearer(s) even though it decides to release at least one of the SCG bearers. In one embodiment, the MeNB decides to drop all the one or more SCG bearers. In such case, the flag may be, for example, a one bit indication to release all SCG-bearer(s). In one embodiment, if the MeNB accepts the type changes included in the SeNB request of step 1, then there is no reason to perform step 2.

According to one embodiment, in case of a split bearer, the MeNB may indicate, via an additional flag in a GTP-U extension header over an X2 user plane, that DRB type change is rejected and DRB release is performed when MeNB decides to release the DRB in step 2. At 3, the SeNB may send an SeNB Modification Request Acknowledgement to the MeNB.

At 4, if the MeNB does not reject all of the one or more SCG bearer type change requests in step 1 (i.e., accepts at least one SCG-bearer type change request of step 1), the MeNB may send an RRCConnectionReconfiguration message to the UE including the new radio resource configuration of the accepted SCG-bearer according to the SCG-Config. For example, if the MeNB accepts at least one of the SCG bearer type changes, then this message in step 4 carries the information to the UE so that the UE knows how to communicate on the modified SCG bearer. In case, the MeNB decides to release all of the one or more SCG bearers, then the MeNB may in step 4 indicate to the UE that the SCG bearers are dropped/released.

In an embodiment, the RRCConnectionReconfiguration message may be sent in parallel of sending the SeNB Modification Request including the flag, before the MeNB receives SeNB Modification Request Acknowledgement. That is, the MeNB need not wait for the Modification Request Acknowledgement message from the SeNB before sending the RRCConnectionReconfiguration to the UE. Proceeding according to this manner may result in faster performance of the UE connection reconfiguration.

It should be noted that both the DRB release and the DRB type change may both be performed in a fast manner with the proposed solution. Without the possibility of the flag of step 2, it would not be possible to support both the DRB release and the DRB type change. It may not be feasible to separately consider both of these cases, instead one solution should support both cases simultaneously. For example, in the case of DRB type change(s) is/are accepted by the MeNB, the MeNB may directly proceed to sending the RRCConnectionReconfiguration message to the UE after step 1 of FIG. 4. That is, steps 2 and 3 of FIG. 4 need not be performed in case the all of the one or more requested type changes is accepted.

At 5, the UE may apply the received new configuration and send a reply RRCConnectionReconfigurationComplete message to the MeNB. Upon successful completion of the reconfiguration, the success of the procedure related to SCG-Config may be indicated in an SeNB Modification Confirm message, at 6.

At 7, if instructed within the new configuration, the UE may perform synchronization towards the cell of the SeNB by using a RACH procedure for communication with the modified SCG bearer corresponding to the new configuration. It should be noted that this embodiment assumes that at least one SCG bearer type change included in the request of step 1 is accepted by the MeNB.

At 8, an SN Status transfer message may be sent from the SeNB to the MeNB, and at 9, data forwarding between the MeNB and the SeNB may take place. Finally, if applicable, a path update may be performed, at 10 between the MeNB, SeNB, S-GW and MME.

As a result of the DRB release described above, an embodiment of the present invention may simultaneously support the DRB release and the DRB type change in a fast manner. This can be accomplished, for example, by introducing a new flag, as described above. It may be important to communicate with the UE as fast as possible in case the SeNB is about to release the bearer. If this communication with the UE is delayed, some data may be lost.

Figure 5:
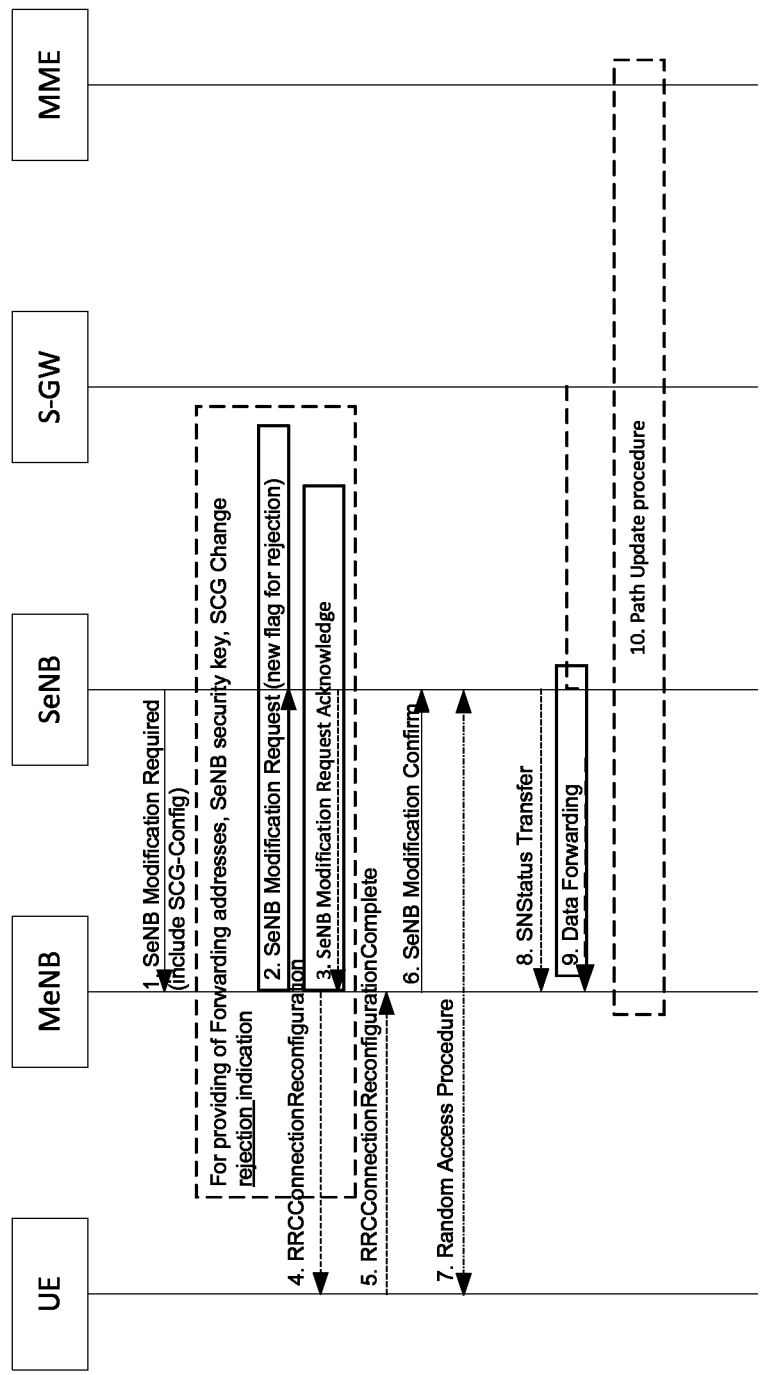
FIG. 5 illustrates an SeNB modification procedure initiated by SeNB, according to certain embodiments.

Certain embodiments of the present invention may also be applicable to changing the existing 3GPP stage 2 specification (TS36.300), as illustrated in FIG. 5. In particular, FIG. 5 illustrates an example of an SeNB modification procedure that is initiated by the SeNB. Other embodiments of the present invention may also be applicable to changing the existing stage 3 document (TS36.423), accordingly.

FIG. 6 illustrates an example of a system according to certain embodiments. In one embodiment, a system may include multiple devices, such as, for example, at least one UE 610, at least one SeNB 620 or other base station or access point, and at least one MeNB 630 or other base station or access point.

Each of these devices may include at least one processor, respectively indicated as 614, 624, and 634. At least one memory can be provided in each device, and indicated as 615, 625, and 635, respectively. The memory may include computer program instructions or computer code contained therein. The processors 614, 624, and 634 and memories 615, 625, and 635, or a subset thereof, can be configured to provide means corresponding to the various blocks and processes of FIGS. 4, 5, 7 and 8.

As shown in FIG. 6, transceivers 616, 626, and 636 can be provided, and each device may also include an antenna, respectively illustrated as 617, 627, and 637. Other configurations of these devices, for example, may be provided as well. For example, MeNB 630 may be configured for wired communication, in addition to wireless communication, and in such a case, antenna 637 can illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception. For example, the transceivers 616, 626, and 636 may be configured to modulate information onto a carrier waveform for transmission by the antennas 617, 627, and 637, and demodulate information received via the antennas 617, 627, and 637 for further processing by other elements of the system shown in FIG. 6. In other embodiments, transceivers 616, 626, and 636 may be capable of transmitting and receiving signals or data directly.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors. The processors may also perform functions associated with the operation of the system including, without limitation, precoding of antenna gain/phase parameters, encoding and decoding of individual bits forming a communication message, formatting of information, and overall control of the system, including process related to management of communication resources.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

Figure 8:
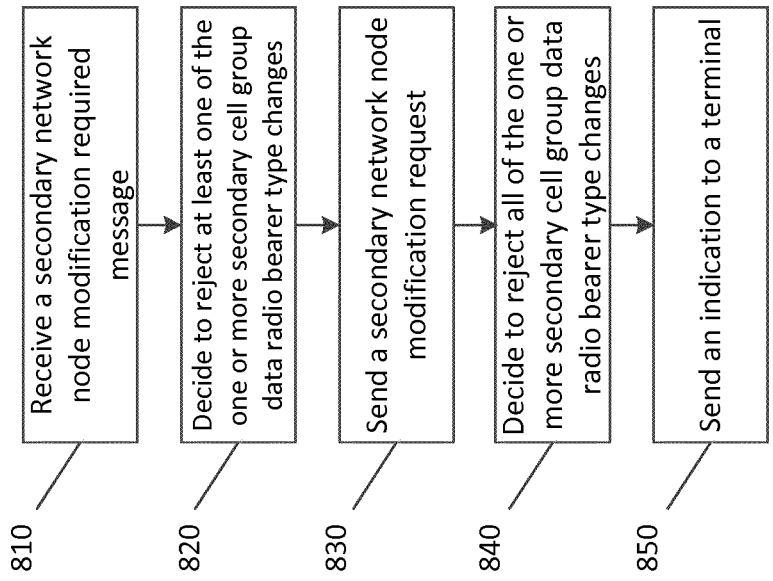
FIG. 8 illustrates another method, according to certain embodiments.
Figure 7:
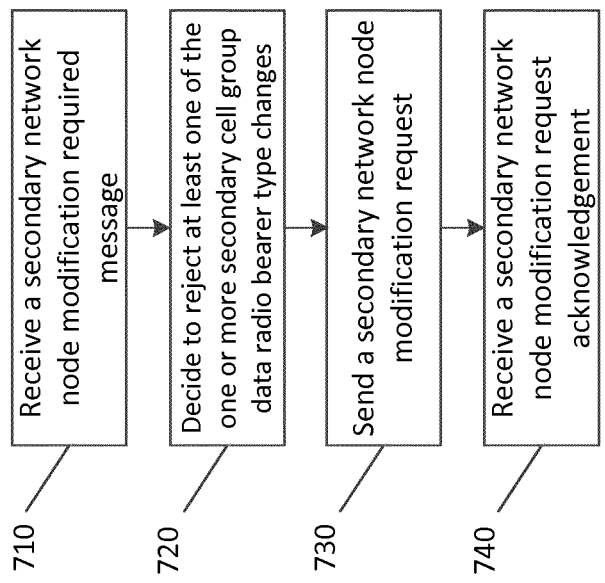
FIG. 7 illustrates a method, according to certain embodiments.

The memory and the computer program instructions can be configured, with the processor for the particular device, to cause a hardware apparatus such as UE 610, SeNB 620, and MeNB 630, to perform any of the processes described herein (see, for example, FIGS. 5, 7 and 8). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a UE, SeNB, and MeNB, embodiments of the invention may be applicable to other configurations, and configurations involving additional elements. For example, not shown, additional UEs may be present, and additional core network elements may be present, as illustrated in FIGS. 4 and 5, for example.

As mentioned above, according to one embodiment, the system shown in FIG. 6 may include a UE 610, SeNB 620, and an MeNB 630, for example. In an embodiment, a network node, such as, for example, SeNB 620, may be controlled by memory 625 and processor 624 to send a secondary network node modification required message including secondary cell group configuration information for one or more secondary cell group data radio bearer type changes. In one embodiment, the secondary cell group configuration information may include the new radio resource configuration of the secondary cell group. In another embodiment, the secondary network node modification required message may include bearer context related information, other UE context information, and a corresponding E-UTRAN E-RAB list for bearer release or modification. Further, in yet another embodiment, in the case of a secondary cell group change, a secondary cell group change indication, together with the secondary cell group configuration information may be included in the secondary network node modification required message.

The SeNB 620 may also be controlled by memory 625 and processor 624 to receive a secondary network node modification request including an indication that at least one secondary cell group data radio bearer type change is rejected by a network node, such as, for example an MeNB, and that release of at least one or more secondary cell group data radio bearers is to be performed at the SeNB 620. In an embodiment, the indication may include a flag, which may be one bit, for example.

In one embodiment, the indication that the at least one secondary cell group data radio bearer type change is rejected by the MeNB 630, and that the release of at least one or more secondary cell group data radio bearers is performed at the SeNB 620 may be indicated in a general packet radio service tunneling protocol user plane extension header over an X2 user plane when the MeNB 630 decides that the data radio bearer is to be released.

The SeNB 620 may further be controlled by memory 625 and processor 624 to send a secondary network node modification request acknowledgment indicating the release of at least one or more secondary cell group data radio bearers has been performed.

According to another embodiment, a network node, such as, for example, MeNB 630, may be controlled by memory 635 and processor 634 to receive a secondary network node modification required message including secondary cell group configuration information for one or more secondary cell group data radio bearer type changes. In one embodiment, the secondary cell group configuration information may include the new radio resource configuration of the secondary cell group. In another embodiment, the secondary network node modification required message may include bearer context related information, other UE context information, and a corresponding E-UTRAN E-RAB list for bearer release or modification. Further, in yet another embodiment, in the case of a secondary cell group change, a secondary cell group change indication, together with the secondary cell group configuration information may be included in the secondary network node modification required message.

The MeNB 630 may also be controlled by memory 635 and processor 634 to decide to reject at least one of the one or more secondary cell group data radio bearer type changes. The MeNB 630 may further be controlled by memory 635 and processor 634 to send a secondary network node modification request including an indication that the at least one secondary cell group data radio bearer type change is rejected by the MeNB 630, and that release of at least one or more secondary cell group data radio bearers is performed at the SeNB 620. In an embodiment, the indication may include a flag, which may be one bit, for example.

In one embodiment, the indication that the at least one secondary cell group data radio bearer type change is rejected by the MeNB 630, and that the release of at least one or more secondary cell group data radio bearers is performed at the SeNB 620 may be indicated in a general packet radio service tunneling protocol user plane extension header over an X2 user plane when the MeNB 630 decides to release the at least one or more secondary cell group data radio bearers.

The MeNB 630 may further be controlled by memory 635 and processor 634 to decide to reject all of the one or more secondary cell group data radio bearer type changes. The MeNB 630 may also be controlled by memory 635 and processor 634 to send an indication to a terminal that all of the one or more secondary cell group data radio bearers are released.

Additionally, MeNB 630 may be controlled by memory 635 and processor 634 to accept at least one secondary cell group data radio bearer type change. MeNB 630 may also be controlled by memory 635 and processor 634 to send a connection reconfiguration message to a terminal, in which the connection reconfiguration message includes the secondary cell group configuration information for at least one accepted secondary cell group data radio bearer. In an embodiment, the connection reconfiguration message may be sent in parallel of sending the secondary network node modification request including the indication.

The MeNB 630 may also be controlled by memory 635 and processor 634 to receive a secondary network node modification request acknowledgment indicating that the at least one secondary cell group data radio bearer type change has been rejected and that the release of one or more secondary cell group data radio bearers has been performed. In an embodiment, the connection reconfiguration message may be sent in parallel of sending the secondary network node modification request including the indication and before the MeNB 630 receives the secondary network node modification request acknowledgment.

In another embodiment, in the case of a split bearer, the MeNB 630 may indicate, via an additional flag in a GTP-U extension header over an X2 user plane that DRB type change is rejected and DRB release is performed when the MeNB decides to release the DRB. In an embodiment, the MeNB 630 may not perform any radio resource control connection termination between the MeNB 630 and the SeNB 620 prior to transmitting the secondary network node modification request.

FIG. 7 illustrates an example of a flow diagram of a method, according to one embodiment. In an embodiment, the method of FIG. 7 may be performed by a network node, such as an MeNB, for example. The method may include, at 710, receiving at the MeNB, a secondary network node modification required message including secondary cell group configuration information for one or more secondary cell group data radio bearer type changes. The method may also include, at 720, deciding to reject at least one of the one or more secondary cell group data radio bearer type changes.

The method may further include, at 730, sending a secondary network node modification request including an indication that the at least one secondary cell group data radio bearer type change is rejected by the MeNB, and that release of at least one or more secondary cell group data radio bearers is performed. In an embodiment, the indication that the at least one secondary cell group data radio bearer type change is rejected by the MeNB, and that the release of at least one or more secondary cell group data radio bearers is to be performed may be indicated in a general packet radio service tunneling protocol user plane extension header over an X2 user plane when the MeNB decides to release the at least one or more secondary cell group data radio bearers. The method may also include at 740, receiving a secondary network node modification request acknowledgement indicating that the at least one secondary cell group data radio bearer type change has been rejected and that the release of one or more secondary cell group data radio bearers has been performed.

FIG. 8 illustrates another example of a flow diagram of a method, according to one embodiment. In an embodiment, the method of FIG. 8 may be performed by a network node, such as an MeNB, for example. The method may include, at 810, receiving at the MeNB, a secondary network node modification required message including secondary cell group configuration information for one or more secondary cell group data radio bearer type changes. The method may also include, at 820, deciding to reject at least one of the one or more secondary cell group data radio bearer type changes. The method may further include, at 830, sending a secondary network node modification request including an indication that the at least one secondary cell group data radio bearer type change is rejected by the MeNB, and that release of at least one or more secondary cell group data radio bearers is performed. In an embodiment, the indication that the at least one secondary cell group data radio bearer type change is rejected by the MeNB, and that the release of at least one or more secondary cell group data radio bearers is to be performed may be indicated in a general packet radio service tunneling protocol user plane extension header over an X2 user plane when the MeNB decides to release the at least one or more secondary cell group data radio bearers.

The method may also include, at 840, deciding to reject all of the one or more secondary cell group data radio bearer type changes. The method may also include, at 850, sending an indication to a terminal that all of the one or more secondary cell group data radio bearers are released. In one embodiment, deciding to reject all of the one or more secondary cell group data radio bearer type changes may take place already in step 820.

Figure 9:
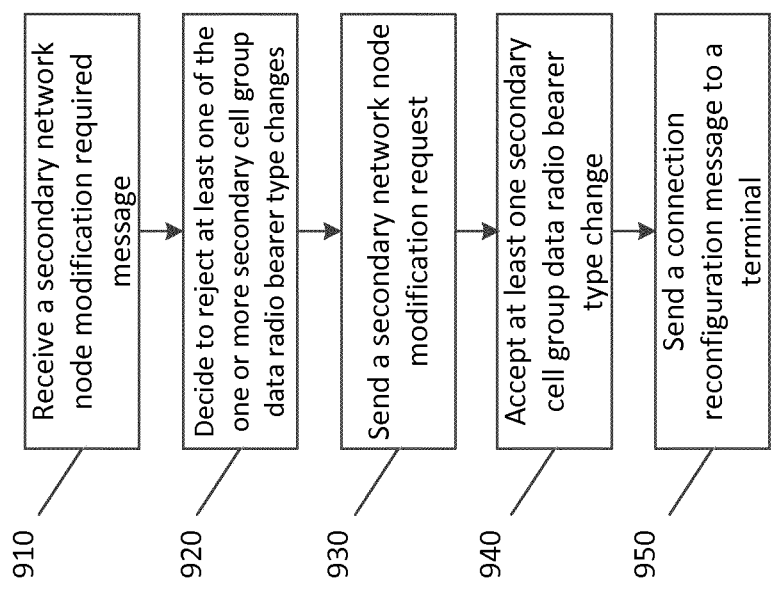
FIG. 9 illustrates another method, according to certain embodiments.

FIG. 9 illustrates another example of a flow diagram of a method, according to one embodiment. In an embodiment, the method of FIG. 9 may be performed by a network node, such as an MeNB, for example. The method may include, at 910, receiving at the MeNB, a secondary network node modification required message including secondary cell group configuration information for one or more secondary cell group data radio bearer type changes. The method may also include, at 920, deciding to reject at least one of the one or more secondary cell group data radio bearer type changes. The method may further include, at 930, sending a secondary network node modification request including an indication that the at least one secondary cell group data radio bearer type change is rejected by the MeNB, and that release of at least one or more secondary cell group data radio bearers is performed. In an embodiment, the indication that the at least one secondary cell group data radio bearer type change is rejected by the MeNB, and that the release of at least one or more secondary cell group data radio bearers is to be performed may be indicated in a general packet radio service tunneling protocol user plane extension header over an X2 user plane when the MeNB decides to release the at least one or more secondary cell group data radio bearer.

The method may also include, at 940, accepting at least one secondary cell group data radio bearer type change. The method may also include, at 950, sending a connection reconfiguration message to the terminal, in which the connection reconfiguration message includes the secondary cell group configuration information.

In an embodiment, the connection reconfiguration message of step 950 may be sent in parallel of sending the secondary network node modification request including the indication in step 930 and before the network node receives the secondary network node modification request acknowledgement. In another embodiment, the MeNB may not perform any radio resource control connection termination between the MeNB and the SeNB prior to transmitting the secondary network node modification request.

Figure 10:
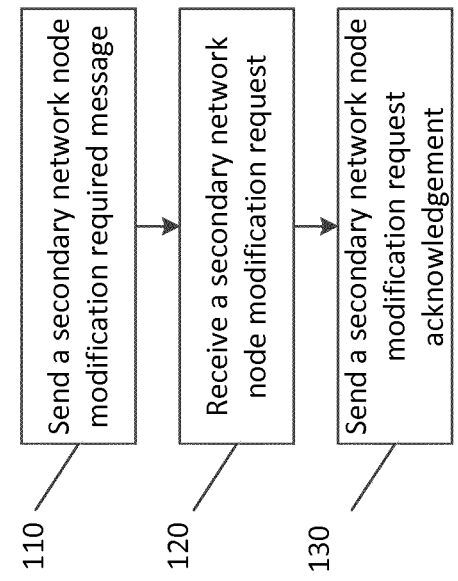
FIG. 10 illustrates another method, according to certain embodiments.

FIG. 10 illustrates an example of a flow diagram of another method, according to one embodiment. In an embodiment, the method of FIG. 10 may be performed by a network node, such as an SeNB, for example. The method may include at 110, sending, from the SeNB, a secondary network node modification required message including secondary cell group configuration information for one or more secondary cell group data radio bearer type changes. The method may also include, at 120, receiving a secondary network node modification request including an indication that at least one secondary cell group data radio bearer type change is rejected by the MeNB, and that release of at least one or more secondary cell group data radio bearers is to be performed at the SeNB.

In an embodiment, the indication that the data radio bearer type change is rejected by the MeNB, and that the release of at least one or more secondary cell group data radio bearers is performed may be indicated in a general packet radio service tunneling protocol user plane extension header over an X2 user plane when the MeNB decides to release the at last one or more secondary cell group data radio bearers.

The method may further include, at 130, sending a secondary network node modification request acknowledgement indicating that the release of at least one or more secondary cell group data radio bearers has been performed.

Embodiments of the invention may provide several advantages. For example, DRB release may be performed in a fast manner Specifically, in one embodiment, the MeNB does not have to wait for an SeNB Modification Request Acknowledgement before performing an RRC procedure. This may be possible by at least introducing a new flag for the rejection of the DRB type change. Additionally, according to other embodiments, the MeNB may perform the RRC procedure with the UE substantially in parallel (e.g. substantially at the same time) of sending the flag to the SeNB. As a result, the UE may be informed faster about the soon-to-be-dropped SCG DRB.

Other advantages achievable by certain embodiments of the invention may also include the ability to enable faster DRB rejection. In particular, the existing solution described above does not support DRB release without introducing the delay of two X2 messages before performing the RRC procedure. As such, embodiments of the invention enable the network to quickly indicate the decision towards the UE after the SeNB initiates the signaling. Accordingly, better performance and user experience when dual connectivity is applied is achieved.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

3 GPP 3rd Generation Partnership Program
C-Plane Control Plane
DRB Data Radio Bearer
eNB EnodeB
EPS Evolved Packet System
E-UTRAN Evolved UTRAN
FDD Frequency Division Duplexing
IP Internet Protocol
LTE Long Term Evolution
MAC Medium Access Control
MCG Master Cell Group
MeNB Master eNB
MME Mobility Management Entity
PDCP Packet Data Convergence Protocol
RACH Random Access Channel
RLC Radio Link Control
RNC Radio Network Controller
RNS Radio Network Subsystem
RRC Radio Resource Control
SCG Secondary Cell Group
SeNB Secondary eNB
S-GW Serving Gateway
SI Study Item
TDD Time Division Duplexing
U-Plane User Plane
UE User Equipment
UMTS Universal Mobile Telecommunications System
UTRAN Universal Mobile Telecommunications System Terrestrial Radio Access Network

I claim:

1. A method, comprising:
receiving, at a master network node from a secondary network node, a secondary network node modification required message comprising secondary cell group configuration information for a plurality of secondary cell group data radio bearer type changes, wherein the secondary network node modification required message is configured to initiate a secondary network node modification procedure;
deciding to reject at least one of the plurality of secondary cell group data radio bearer type changes;
deciding to accept at least one other of the plurality secondary cell group data radio bearer type changes;
sending, from the master network node to the secondary network node, a secondary network node modification request comprising an indication that the master network node rejected the at least one of the plurality of secondary cell group data radio bearer type changes, and that release of at least one secondary cell group data radio bearer, for which the master network node rejected a secondary cell group data radio bearer type change, is to be performed with the secondary network node; and
sending, from the master network node to a terminal, a connection reconfiguration message, wherein the connection reconfiguration message includes secondary cell group configuration information for the at least one accepted secondary cell group data radio bearer type change, wherein the sending of the connection reconfiguration message is done before the master network node receives a secondary network node modification request acknowledgement from the secondary network node.

2. The method according to claim 1, wherein the indication that the master network node rejected at least one of the plurality of secondary cell group data radio bearer type changes, and that the release of the at least one secondary cell group data radio bearer, for which the master network node rejected a secondary cell group data radio bearer type change, is to be performed with the secondary network node, is indicated in a general packet radio service tunneling protocol user plane extension header over an X2 user plane when the master network node decides to release the at least one secondary cell group data radio bearer for which the master network node rejected a secondary cell group data radio bearer type change.

3. The method according to claim 1, where the secondary network node modification request acknowledgement indicates that the at least one of the plurality of secondary cell group data radio bearer type changes has been rejected and that the release of the at least one secondary cell group data radio bearer, for which the master network node rejected a secondary cell group data radio bearer type change, has been performed with the secondary network node.

4. The method according to claim 3, wherein the connection reconfiguration message is sent to the terminal in parallel of the sending of the secondary network node modification request comprising the indication before the master network node receives the secondary network node modification request acknowledgement.

5. The method according to claim 1, wherein the master network node does not perform any radio resource control connection termination between the master network node and the secondary network node prior to sending the secondary network node modification request.

6. An apparatus, comprising:
at least one processor; and
at least one non-transitory memory including computer program code,
wherein the at least one non-transitory memory and the computer program code are configured, with the at least one processor, to cause the apparatus at least to:
receive, from a secondary network node, a secondary network node modification required message comprising secondary cell group configuration information for a plurality of secondary cell group data radio bearer type changes, wherein the secondary network node modification required message is configured to initiate a secondary network node modification procedure;
decide to reject at least one of the plurality of secondary cell group data radio bearer type changes;
decide to accept at least one other of the plurality of secondary cell group data radio bearer type changes;
send, to the secondary network node, a secondary network node modification request comprising an indication that the apparatus rejected the at least one of the plurality of secondary cell group data radio bearer type changes, and that release of at least one secondary cell group data radio bearer, for which the apparatus rejected a secondary cell group data radio bearer type change, is to be performed with the secondary network node; and
send, to a terminal, a connection reconfiguration message, wherein the connection reconfiguration message includes secondary cell group configuration information for the at least one accepted secondary cell group data radio bearer type change, wherein sending the connection reconfiguration message is done before the master network node receives a secondary network node modification request acknowledgement from the secondary network node.

7. The apparatus according to claim 6, wherein the indication that the apparatus rejected at least one of the plurality of secondary cell group data radio bearer type changes, and that the release of the at least one secondary cell group data radio bearer, for which the apparatus rejected a secondary cell group data radio bearer type change, is to be performed with the secondary network node, is indicated in a general packet radio service tunneling protocol user plane extension header over an X2 user plane when the apparatus decides to release the at least one secondary cell group data radio bearer for more which the apparatus rejected a secondary cell group data radio bearer type change.

8. The apparatus according to claim 6, wherein the the secondary network node modification request acknowledgement indicates that the at least one of the plurality of secondary cell group data radio bearer type changes has been rejected and that the release of the at least one secondary cell group data radio bearer, for which the apparatus rejected a secondary cell group data radio bearer type change, has been performed with the secondary network node.

9. The apparatus according to claim 8, wherein the connection reconfiguration message is sent to the terminal in parallel of sending the secondary network node modification request comprising the indication before the apparatus receives the secondary network node modification request acknowledgement.

10. The apparatus according to claim 6, wherein the apparatus does not perform any radio resource control connection termination between the apparatus and the secondary network node prior to sending the secondary network node modification request.

11. The method according to claim 1, wherein the master network node is connected to the terminal as part of a multi-connectivity mode of operation with the secondary network node and the terminal.

12. A computer program product embodied on a non-transitory computer readable storage medium, comprising computer program code configured to, when executed on at least one processor, cause an apparatus to:
receive, from a secondary network node, a secondary network node modification required message comprising secondary cell group configuration information for a plurality of secondary cell group data radio bearer type changes, wherein the secondary network node modification required message is configured to initiate a secondary network node modification procedure;
decide to reject at least one of the plurality of secondary cell group data radio bearer type changes;
decide to accept at least one other of the plurality of secondary cell group data radio bearer type changes;
send, to the secondary network node, a secondary network node modification request comprising an indication that the apparatus rejected the at least one of the plurality of secondary cell group data radio bearer type changes, and that release of at least one secondary cell group data radio bearer, for which the apparatus rejected a secondary cell group data radio bearer type change, is to be performed with the secondary network node; and
send, to a terminal, a connection reconfiguration message, wherein the connection reconfiguration message includes secondary cell group configuration information for the at least one accepted secondary cell group data radio bearer type change, wherein sending the connection reconfiguration message is done before the master network node receives a secondary network node modification request acknowledgement from the secondary network node.

* * * * *

UNITED STATES PATENT AND TRADEMARK OFFICE
CERTIFICATE OF CORRECTION

PATENT NO. : 10,462,841 B2
APPLICATION NO. : 15/542492
DATED : October 29, 2019
INVENTOR(S) : Tsunehiko Chiba It is certified that error appears in the above-identified patent and that said Letters Patent is hereby corrected as shown below:

In the Claims

In Claim 7:
Column 17, Line 13, "more" should be deleted.

Signed and Sealed this
Seventeenth Day of December, 2019

Andrei Iancu
*Director of the United States Patent and Trademark Office*